(12) United States Patent
Joronen

(10) Patent No.: US 10,584,298 B2
(45) Date of Patent: Mar. 10, 2020

(54) METHOD FOR MANUFACTURING BIOMASS BASED FUEL CONFIGURED TO REDUCE A CHEMICAL AND/OR MECHANICAL EFFECT OF FLUE GAS ON HEAT TRANSFER SURFACES

(71) Applicant: Valmet Technologies Oy, Espoo (FI)

(72) Inventor: Tero Joronen, Tampere (FI)

(73) Assignee: Valmet Technologies Oy, Espoo (FI)

( * ) Notice: Subject to any disclaimer, the term of this patent is extended or adjusted under 35 U.S.C. 154(b) by 38 days.

(21) Appl. No.: 15/776,700

(22) PCT Filed: Nov. 10, 2016

(86) PCT No.: PCT/FI2016/050792
§ 371 (c)(1),
(2) Date: May 16, 2018

(87) PCT Pub. No.: WO2017/089648
PCT Pub. Date: Jun. 1, 2017

(65) Prior Publication Data
US 2019/0203134 A1    Jul. 4, 2019

(30) Foreign Application Priority Data

Nov. 26, 2015  (FI) ..................... 20155876

(51) Int. Cl.
*C10L 10/06*     (2006.01)
*C10L 10/02*     (2006.01)
(Continued)

(52) U.S. Cl.
CPC ............... *C10L 10/06* (2013.01); *C10L 5/363* (2013.01); *C10L 5/442* (2013.01); *C10L 5/445* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,159,683 A | 7/1979 | Hughes et al. | |
| 2012/0312206 A1* | 12/2012 | Dorner | F23J 9/00 110/342 |
| 2015/0315505 A1* | 11/2015 | Hayashi | C10L 5/44 44/532 |

FOREIGN PATENT DOCUMENTS

| BE | 1019595 A3 | 9/2012 |
|---|---|---|
| CN | 103409199 A | 11/2013 |

(Continued)

OTHER PUBLICATIONS

Biswas, Amit Kumar, et al., "Steam pretreatment of *Salix* upgrade biomass fuel for wood pellet production", *Fuel Processing Technology*, Apr. 11, 2011, pp. 1711-1717, vol. 92, No. 9, Elsevier BV, NL.

(Continued)

*Primary Examiner* — Ellen M McAvoy
*Assistant Examiner* — Chantel L Graham
(74) *Attorney, Agent, or Firm* — Alston & Bird LLP

(57) ABSTRACT

A method for manufacturing biomass based fuel configured to reduce chemical and/or mechanical effects of flue gas on heat transfer surfaces is described. The method comprises providing biomass and steam into a reactor; maintaining said biomass and said steam simultaneously in the reactor, in a pressure of at least 10 bar(a) and at a temperature from 180° C. to 250° C. for at least 2 minutes; and decreasing the pressure in the reactor and/or conveying biomass out of the reactor such that the pressure of the environment of the biomass decreases below 5 bar(a), to produce steam-exploded biomass. The method further comprises adding some combustion additive to the biomass and/or the steam-exploded biomass.

6 Claims, 5 Drawing Sheets

(51) Int. Cl.
*C10L 10/04* (2006.01)
*C10L 5/44* (2006.01)
*C10L 5/48* (2006.01)
*C10L 9/12* (2006.01)
*C10L 5/36* (2006.01)

(52) U.S. Cl.
CPC ................................ *C10L 5/48* (2013.01); *C10L 9/12* (2013.01); *C10L 10/02* (2013.01); *C10L 10/04* (2013.01); *C10L 2200/029* (2013.01); *C10L 2200/0213* (2013.01); *C10L 2200/0272* (2013.01); *C10L 2230/02* (2013.01); *C10L 2290/08* (2013.01); *C10L 2290/141* (2013.01); *C10L 2290/148* (2013.01); *C10L 2290/22* (2013.01); *C10L 2290/28* (2013.01); *C10L 2290/30* (2013.01); *C10L 2290/46* (2013.01); *C10L 2290/48* (2013.01); *C10L 2290/545* (2013.01); *Y02E 50/10* (2013.01); *Y02E 50/14* (2013.01); *Y02E 50/30* (2013.01)

(56) References Cited

FOREIGN PATENT DOCUMENTS

| | | |
|---|---|---|
| CN | 103483596 A | 1/2014 |
| CN | 104629848 A | 5/2015 |
| WO | WO 2011/078928 A1 | 6/2011 |
| WO | WO 2014/041373 A1 | 3/2014 |

OTHER PUBLICATIONS

Finnish Patent and Registration Office, Office Action and Search Report for Application No. 20155876, dated Mar. 24, 2016, 8 pages, Finland.

International Preliminary Examining Authority, International Preliminary Report on Patentability (Chapter II), including Applicant's Sep. 6, 2017 Response to ISA's Feb. 13, 2017 Written Opinion, for International Application No. PCT/FI2016/050792, dated Feb. 20, 2018, 18 pages, European Patent Office, Germany.

International Searching Authority (ISA), International Search Report and Written Opinion for International Application No. PCT/FI2016/050792, dated Feb. 13, 2017, 10 pages, European Patent Office, Netherlands.

Tumuluru, Jaya Shankar, et al., "Formulation, Pretreatment, and Densification Options to Improve Biomass Specifications for Co-Firing High Percentages with Coal", *Industrial Biotechnology*, Jun. 2012, pp. 113-132, vol. 8, No. 3, Mary Ann Liebert, Inc., US.

Vamvuka, D., et al., "Ash effects during combustion of lignite/biomass blends in fluidized bed", *Renewable Energy*, 2009, pp. 2662-2671, vol. 34, Elsevier, Ltd., UK.

Wilen, C., et al., "Pelletization and Combustion of Straw", Symposium on Energy from Biomass and Wastes X, Apr. 10, 1986, pp. 469-484, vol. 10, US.

\* cited by examiner

METHOD FOR MANUFACTURING BIOMASS BASED FUEL CONFIGURED TO REDUCE A CHEMICAL AND/OR MECHANICAL EFFECT OF FLUE GAS ON HEAT TRANSFER SURFACES

CROSS REFERENCE TO RELATED APPLICATIONS

This application is a National Stage Application, filed under 35 U.S.C. 371, of International Application No. PCT/FI2016/050792, filed Nov. 10, 2016, which claims priority to Finnish Application No. 20155876, filed Nov. 26, 2015; the contents of both of which are hereby incorporated by reference in their entirety.

BACKGROUND

Related Field

The invention relates to production of energy from biomass. The invention relates to burnable solid biomass based fuel, such as briquettes or pellets, and combustion of such solid biomass based fuel. The invention relates to solid biomass based fuel configured to reduce chemical and/or mechanical effects of flue gas on heat transfer surfaces. An embodiment relates to solid biomass based fuel having improved fouling behaviour, when burned in a furnace. An embodiment relates to solid biomass based fuel having reduced corrosion potential, when burned in a furnace. The invention relates to methods for manufacturing such solid biomass based fuel. The invention relates to devices and systems for manufacturing such solid biomass based fuel.

Description of Related Art

Coal is commonly burned in power plants to produce heat and/or electricity. Coal is a fossil fuel, typically black or brownish-black sedimentary rock. Before combustion, the coal is typically pulverized. Because of environmental issues, there is interest for replacing at least some of the coal with biomass, such as wood, wood residues, agricultural residues, and similar. When co-firing coal and biomass, the biomass is typically also ground to small size. Biomass or biomass based fuel may be supplied to the power plant in the form of pellets or briquettes, which are ground before combustion.

However, this process has some drawbacks. The grinding of the biomass based fuel to sufficiently fine powder may be problematic. Moreover, when co-fired, the slagging of the furnace and the fouling of the heat exchangers are much more extensive than when only coal is used. Slagging and fouling reduce the heat transfer from flue gases to heat transfer medium. In addition, some compounds, such as alkalichlorides, of flue gases are corrosive, and thus corrode heat transfer surfaces. Moreover, the extra solid layer on the heat transfer surfaces also affects the tendency of corrosion. In this way, in general, use of biomass produces flue gas that has some unwanted chemical and/or mechanical effects on the heat transfer surfaces. As indicated above, such unwanted effects include corrosion (chemical process) and fouling (mechanical process).

BRIEF SUMMARY

It has been discovered, that biomass can be steam exploded before use when co-fired with coal. It has been found that this simplifies the grinding process of the solid biomass based fuel at the power plant. Moreover, it has been found that by adding suitable combustion additives to the solid biomass based fuel, the chemical and/or mechanical effects of flue gas, including all its components, on heat transfer surfaces can be reduced. In particular, fouling-behaviour and/or corrosion-tendency on the heat transfer surfaces can be improved.

The invention is primarily characterized by the independent claims. The invention is also summarized in the appended examples.

DETAILED DESCRIPTION OF VARIOUS EMBODIMENTS

Figure 1A:
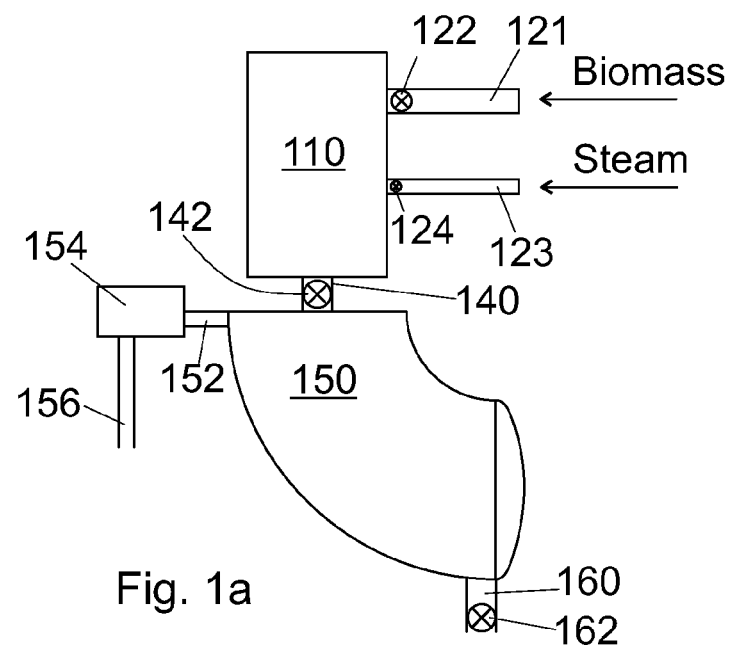
FIG. 1a shows a device for producing steam-exploded biomass in a batch process.

In this description, the term "biomass" refers to biomass that originates from plants. Biomass may typically comprise virgin and/or waste materials of plant origin, such as virgin wood, wood residues, forest residues, industrial waste or by-products, agricultural waste or by-products, residues or by-products of the wood-processing industry, organic components of municipal solid waste (MSW), and any combinations thereof. Suitably said biomass comprises waste and by-products of the wood-processing industry such as slash, urban wood waste, lumber waste, wood chips, wood waste, sawdust, straw, firewood, or wood materials. Preferably, the biomass comprises some residue of wood-processing industry, such as sawdust, chips, splinters, chippings, shavings, or cuttings. Preferably, the biomass comprises at least one of wood, bamboo, bagasse, straw, and grass. Thus, biomass, at least before pre-treatment, comprises cellulose fibres. However, as will become clear, a pre-treatment of the biomass may result in breaking and/or defibrillation of cellulose fibres. Moreover, the biomass, at least before pre-treatment, comprises lignin. After a pre-treatment, when the treated biomass is hot, the lignin may be softened at least to some extent. Accordingly, biomass comprises cellulose. In an embodiment, biomass, at least before a steam treatment, comprises hemicellulose. In an embodiment, biomass, at least before a steam treatment, comprises lignin.

The term biomass based fuel refers burnable material that has been obtained from at least biomass. The biomass may have been treated by an industrial process. The invention relates to such biomass based fuel that is in solid form. The term solid refers to a state that is neither gas nor liquid in the pressure 1 atm and at the temperature 30° C. However, the biomass based fuel may be in granular or powdered form (in this temperature/pressure). Preferably, the biomass based fuel is in solid form in such environments, wherein the pressure is 1 atm and the temperature is less than 60° C.; e.g. from −35° C. to 60° C. In an embodiment, the temperature of the biomass based fuel is at most 150° C. or at most 90° C.

When biomass is co-fired with coal in a furnace, both of them are typically ground to fine powder before combustion. Moreover, the biomass may be pelletized before grinding. As known in the art, the biomass for the pellets may be ground to sufficiently small particle size before pelletizing, and/or the biomass may be thermally treated. When the biomass is not thermally treated, the resulting pellets are referred to as white pellets, because of their light brown colour. However, the biomass may be thermally treated, which typically darkens the biomass and the resulting pellets. Such pellets are commonly referred to as "black" pellets, because of their dark brown colour. Thermal treatment methods include torrefaction and steam explosion. As indicated above, biomass based fuel refers to also other forms than pellets.

It has been found that of these various types of biomass, steam-exploded biomass is most easy to grind to a fine particle size. This is probably because the steam explosion breaks some of the cellulose fibres and/or defibrillates some of the cellulose fibres of the biomass. In addition, steam explosion decomposes some of the hemicellulose of the biomass; and the decomposition of hemicellulose may also affect the brittleness of the biomass. For example, when ground with similar process parameters (grinding blades, speed, and time), white pellets resulted in powder having a median particle size of 400 µm, and black pellets (comprising steam-exploded biomass) resulted in powder having a median particle size of only 200 µm. The grinding process is also at the same time using less energy. In a test, the electricity consumption was 34% lower.

Steam explosion is a process, in which biomass is first steam treated in a reasonably high pressure, and then the pressure is rapidly decreased, whereby the steam treated biomass becomes steam-exploded.

Before steam treatment, the moisture content of the biomass may be e.g. in the range from 0 w-% to 70 w-%, preferably from 0 w-% to 60 w-%, and most preferably in the range from 0 w-% to 30 w-%. This is to ensure that a reasonable amount of steam penetrates into the biomass in the steam treatment. Biomass may be dried before steam treatment. To decrease the steam treatment time of the biomass, the size of the pieces of biomass before steam treatment is preferably less than 3 cm, less than 2 cm, such as less than 1 cm or less than 5 mm. The size refers to sieve size. Suitable size may have been obtained by sawing, chipping, grinding, or other suitable means, if needed.

In steam explosion, both biomass and steam are provided into a reactor to treat the biomass with the steam. The biomass and the steam are maintained simultaneously in the reactor in a pressure of at least 10 bar(a) and at a temperature from 180° C. to 250° C. for al least 2 minutes. Throughout this description the unit bar(a) refers to absolute pressure in bars. Thereafter, the biomass is exposed to an environment with a lower pressure, such as at most 5 bar(a), preferably to an environment with atmospheric pressure, or even to vacuum. To achieve a suitable degree of explosion, the decrement of pressure is done rapidly. Typically, biomass and steam are let out from the reactor 110, whereby the pressure drops to the lower level instantaneously, or in more precise words, in less than 5 seconds, or more typically, in less than one second.

In the steam treatment before the explosion, the biomass and the steam are preferably maintained simultaneously in the reactor 110 for at least 10 minutes or at least 15 minutes. In an embodiment, the pressure and temperature inside the reactor correspond to water vapour saturation temperature and pressure. In an embodiment, the biomass and the steam are maintained simultaneously in the reactor for at most 1 hour or at most 30 minutes. This ensures effective use of the equipment. Moreover, preferably, the pressure in the reactor is kept below 35 bar(a) or below 25 bar(a) to reduce investment costs. The pressure in the reactor may be e.g. from 15 bar(a) to 25 bar(a) to decrease the steam treatment time. A suitable pressure may thus belong to a range 10 bar(a)-35 bar(a) or to a range 15 bar(a)-25 bar(a).

Depending on the equipment, the process may be a batch process or a continuous process. In a batch process, the pressure in the reactor is decreased such that the pressure of the environment of the biomass decreases to the aforementioned lower pressure. With reference to FIG. 1a, in a batch process, the reactor 110 may be a pressure vessel. Biomass is fed to the reactor 110 with means 121 for feeding biomass, such as a feeding screw 121. A valve 122 may be open while feeding biomass, and closed during steam treatment of biomass. Correspondingly, steam is fed to the reactor 110 with means 123 for feeding steam, such as a pipeline 123. A valve 124 may be open while feeding steam, and closed during steam treatment of biomass.

The reactor 110 comprises an outlet 140 for letting out steam treated biomass. A valve 142 may be arranged to the outlet. The valve 142 may be opened to let out the steam and the steam treated biomass to a vessel 150; and closed while steam treating the biomass. The vessel 150 is configured to receive the steam treated biomass from the reactor 110. The vessel 150 comprises an outlet 152, such as a pipeline 152 for letting out steam from the vessel. In this way, the pressure of the vessel 150 is significantly lower than in the reactor 110. When entering the low-pressure vessel 150, the steam treated biomass explodes, and becomes steam-exploded biomass. The arrangement may comprise a condenser 154 to recover heat from the steam. The arrangement may comprise means 156 for utilizing the condensate, such as a pipeline 156. It is also possible to utilize the steam without a condenser 154. The vessel 150 further comprises an outlet 160 for letting out steam-exploded biomass from the vessel 150. A valve 162 may be opened for letting out the steam-exploded biomass.

A batch reactor may comprise two vessels (110, 150), as in FIG. 1a, or only one reactor 110, of which pressure is decreased for steam explosion.

Figure 1B:
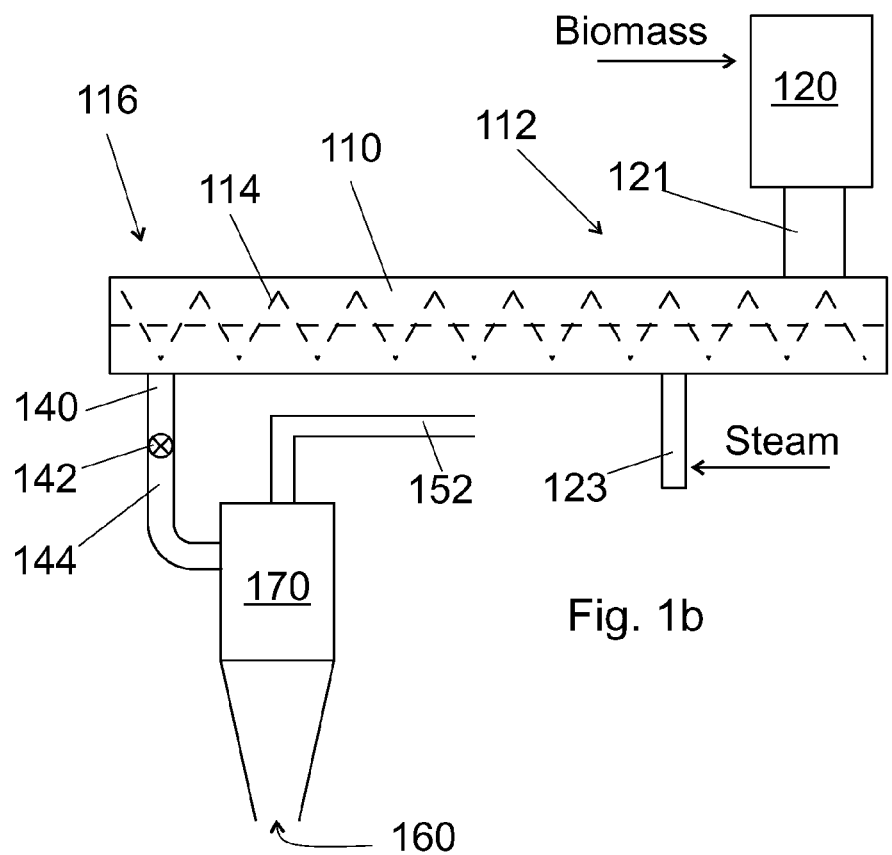
FIG. 1b shows a device for producing steam-exploded biomass in a continuous process.

In a continuous process, biomass is conveyed out of the reactor such that the pressure of the environment of the biomass decreases to the aforementioned lower pressure. With reference to FIG. 1b in a continuous process biomass is fed to the reactor 110 with means 121 for feeding biomass, such as a feeding screw 121. Biomass may be fed from a container 120. Correspondingly, steam is fed to the reactor 110 with means 123 for feeding steam, such as a pipeline 123. The steam and biomass may be fed to an inlet end 112 of the reactor 110. The reactor comprises means 114 for moving biomass from the inlet end 112 to the outlet end 116 of the reactor 110. The means 114 for moving the biomass may comprise e.g. a screw conveyor 114 or another conveyor.

The reactor 110 comprises an outlet 140 for letting out steam treated biomass. A valve 142 may be arranged to the outlet. The opening of the valve 142 may be arranged such that the pressure in the reactor 110 remains in the aforementioned pressure level. The screw conveyor 114 may be configured to transport the biomass at such a speed that the biomass is treated with steam for a sufficiently long time as discussed above.

After the valve 142, in the pipeline 144, the pressure is at the aforementioned lower level, whereby the biomass will be steam exploded when coming through the valve 142. Steam may be separated from steam-exploded biomass in a means 170 for separating steam-exploded biomass from steam, such as a cyclone 170. The cyclone may comprise an outlet 152 for letting out steam and an outlet 160 for letting out steam-exploded biomass. As an alternative to a cyclone 170, any separation method, e.g. a filter or a sieve may be used.

Typically, steam explosion treatment opens up at least some the fibres of the biomass. Before steam explosion, biomass comprises fibres comprising cellulose embedded in a matrix of lignin and cross connected with hemicellulose. The cellulose is partly amorphous and partly crystalline. This composite structure of the biomass (e.g. wood cell wall) is destroyed during steam explosion and the individual components of the fibres are released.

Steam explosion treatment releases hemicelluloses from the wood cell walls and makes them accessible to chemical and biochemical degradation. Both steam and acetic acid, which is released from the biomass during steam explosion, trigger the hydrolysis of hemicelluloses. The polymer chains are cleaved and $C_5$ sugars, mainly xylose, is released and further degraded into furfural.

The major role of hemicelluloses in wood is to impart viscoelastic properties. The degradation of hemicellulose makes wood more brittle and rigid, compared to untreated wood. The removal of OH groups (dehydration reactions) results in a more hydrophobic surface, compared to hydrophobicity of surfaces of untreated biomass. The brittleness (better grindability) and higher moisture resistance are important properties for use of steam-exploded biomass. Use of steam-exploded biomass may comprise substitution of at least some coal in power plants. Use of steam-exploded biomass may comprise formation of pellets from steam-exploded biomass. Cellulose and lignin are also affected by steam explosion conditions. At high pressures cellulose molecules are deconstructed and degraded to furfural (5-hydroxymethylfurfural). Lignin undergoes cleavage reactions of the acid insoluble (high molecular weight) lignin and low molecular weight lignin are formed due to condensation reactions. It has also been suggested that in steam explosion, lignin is melting, flowing and condensing in form of beads on the surface of the cellulose microfibrils and as such increases porosity. In addition, the lignin may undergo depolymerisation and re-polymerization.

In steam explosion, some of the cellulose fibres of the biomass break and/or undergo defibrillation. Thus, in an embodiment, the solid biomass based fuel 300 comprises steam-exploded biomass comprising defibrillated cellulose. In an embodiment, the solid biomass based fuel 300 comprises steam-exploded biomass comprising broken cellulose fibres. The solid biomass based fuel 300 may be used to form pellets 310. The density of pellets comprising steam-exploded biomass is typically reasonably large, e.g. in the order of from 630 kg/m³ to 1200 kg/m³ or from 630 kg/m³ to 750 kg/m³. However, when additives are added, the density may become even higher, say up to 1300 kg/m³ or up to 1000 kg/m³ (i.e. $1.0 \times 10^3$ kg/m³).

Moreover, in steam explosion, some hemicelluloses of the biomass decompose to monomers. Still further, some of the lignin of the biomass is softened. Lignin and sugars form pseudolignin upon steam explosion. Because of the decomposition of hemicellulose and cellulose, the steam-exploded biomass is more brittle than raw biomass. The brittleness may be seen as a factor for improving the grindability of the steam-exploded biomass. In addition, because of the softening of the lignin, at least some of the cellulose fibres may be more accessible to such additives that will be discussed below.

Biomass and biomass based fuel can be more easily handled in the form of pellets or briquettes. The term pellet here refers to a solid piece of material having a shape of a profile extending in a longitudinal direction. A pellet is typically pressed from fine grained solid material. The size of the piece in a direction perpendicular to the longitudinal direction (e.g. a diameter of a circular pellet) may be e.g. from 5 mm to 15 mm, such as from 6 mm to 12 mm. The length of a pellet is typically e.g. from 5 mm to 30 mm. Pellets are commonly produced by pressing fine material through holes, whereby the size of the holes define the transverse size of the pellet. A briquette also is a solid piece of material. The size of a briquette is typically larger than the size of a pellet. A briquette may be e.g. pressed into a form using grained material.

Pelletizing increases the density of the material. Moreover, pellets are more easily handled than biomass or biomass based fuel in its original form, which is typically powder with small grain size. Still further, pelletizing can be used to reduce dust formation during transportation. Similar benefits can be seen for briquettes. In short, from the point of view of logistics, pellets (or briquettes) are superior compared to powdered biomass, granular biomass, powdered biomass based fuel, or granular biomass based fuel having a smaller granule size than the pellets. The steam-exploded biomass 160 may be used for the production of pellets or briquettes.

Figure 1C:
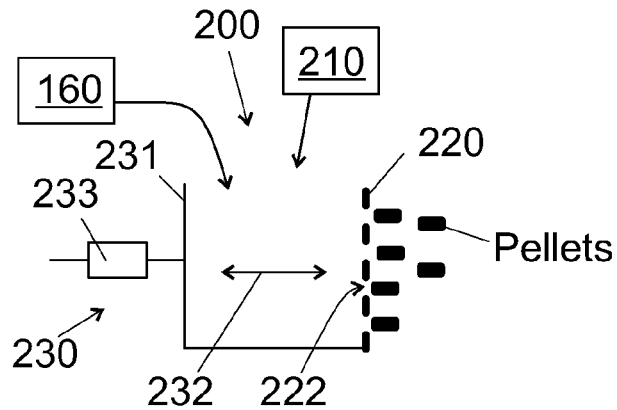
FIG. 1c shows a pelletizing device, configured to form pellets from biomass and suitable additives.

FIG. 1c shows a process of pelletization. Before pelletization, the steam-exploded biomass may be ground to sufficiently small size, unless already ground before the steam-explosion process. In pelletization, the biomass (e.g. steam-exploded biomass) is compressed into the form of pellets. With reference to FIG. 1c, the steam-exploded biomass may be conveyed from the outlet 160 to a pelletizing device 200. The pelletizing device 200 comprises means 230 for pressing the steam-exploded biomass towards on orifice 222. The means 230 may comprise a pressure plate 231 and a piston 233. Alternative, the means 230 may comprise a screw. The orifice 222 may be arranged in a plate 220 having multiple orifices 222. When compressed, the steam-exploded biomass passes through the orifice 222 to form pellets. Compression is indicated in FIG. 1c by the arrow 232 to show the movement of the pressure plate. Starch or some other burnable polymer material may be used as an adhesive to strengthen the pellets. The pelletizing device 200 may comprise means 210 for adding polymer additives to the steam-exploded biomass before producing the pellets.

As indicated above, pellets with steam-exploded biomass, even if easily grindable, may result in flue gas having unwanted chemical and/or mechanical effects on the heat transfer surfaces. Herein flue gas means all the components of the flue gas flowing through a flue gas duct in use of a furnace. In particular, flue gas comprises gaseous compounds. Typically flue gas further comprises fly ash, which may be solid or at least partly molten. Flue gas may further comprise other liquid compounds, e.g. resulting from condensing of said gaseous compounds. Moreover, flue gas refers to such flue gas that is obtainable by burning said steam-exploded biomass or the biomass based fuel.

In particular, use of steam-exploded biomass, e.g. in the form of pellets and/or briquettes, may result in quite a lot of fouling and/or corrosion when co-fired with coal, or when fired without coal. In various embodiments, some combustion additive is added to the biomass and/or the steam-exploded biomass. In an embodiment, the combustion additive is selected from a group of additives that are capable of reducing a chemical and/or mechanical effect of flue gas on a hear transfer surface. In an embodiment, the combustion additive is configured to reduce a chemical and/or mechanical effect of flue gas on a heat transfer surface. The heat transfer surface refers to a surface, that is, in use, configured to be in contact with the flue gases produced by combustion of the steam-exploded biomass or the biomass based fuel. The heat transfer surface may be e.g. an inner surface of a furnace or a flue gas channel, or a surface of a heat exchanger.

In an embodiment, the combustion additive comprises fouling-reducing additive. Fouling is a mechanical effect of the flue gas on a heat transfer surface. In an embodiment, the combustion additive comprises additive that reduces the corrosion potential of biomass. Corrosion is a chemical effect the flue gas has on a heat transfer surface. In an embodiment, the combustion additive comprises both a fouling-reducing additive and an additive that reduces the corrosion potential of biomass. Moreover, the combustion additive may comprise substance or substances suitable for use as nutrients.

Figure 2:
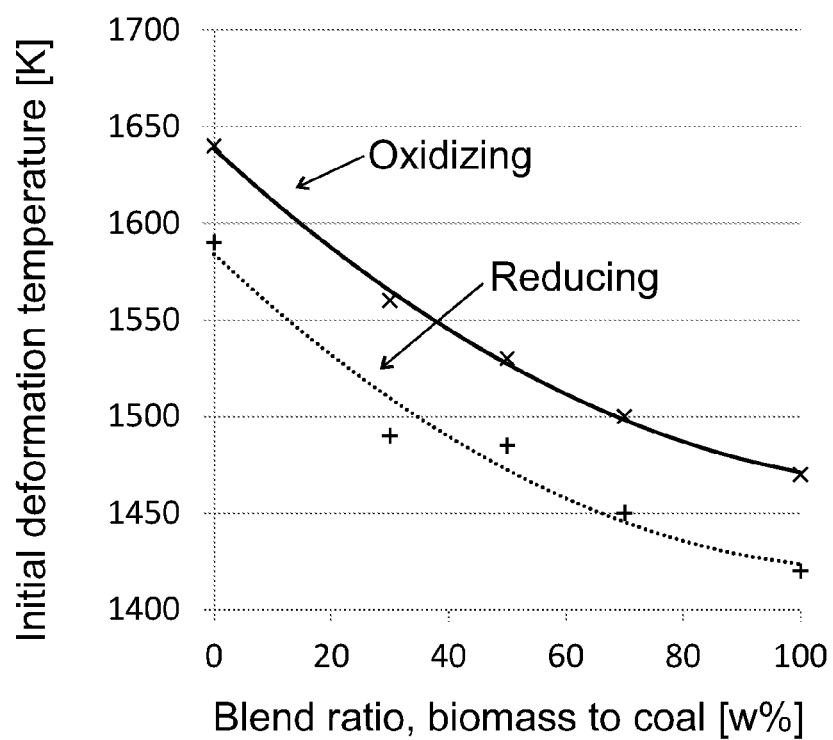
FIG. 2 shows an initial deformation temperature of ash under oxidizing and reducing conditions, when the ash is formed by burning a blend of biomass and coal.

The intensive fouling on heat transfer surfaces, when biomass is used as fuel, seem to result from the low melting temperature of the ash of the biomass; or the low melting temperature of the ash resulting from burning a combination of coal and biomass. The melting point of the ash may be characterized by an initial deformation temperature, i.e. a temperature at which ash starts to deform. Typically, the initial deformation temperature of ash is determined by testing. Such a test is performed in a laboratory and for samples of fuel comprising the ash. FIG. 2 indicates the initial deformation temperature of the ash as a function of the content of steam-exploded biomass in a fuel consisting of steam-exploded biomass and coal, as analysed in a laboratory. On the left hand side, only coal is used as the fuel, and on the right hand side, only steam-exploded biomass is used. The initial deformation temperature is depicted in oxidizing conditions, wherein a sufficient amount of oxygen is available for the combustion of the fuel; and in reducing conditions, wherein only a sub-stoichiometric amount of oxygen is available. As indicated in the Figure, the melting point decreases by about 150 K when the amount of coal changed from 100 w-% to 0 w-%. It is assumed that the lower melting point of the ash results in melting of the ash in the furnace. The molten ash then adheres onto the heat transfer surfaces more easily than solid ash would, which is evidenced by increased fouling in real boiler conditions.

It has been found that the fouling behaviour can be improved, e.g. the formation of foul on heat transfer surfaces reduced, by adding a suitable fouling-reducing additive to the feedstock (i.e. biomass or steam-exploded biomass). The fouling-reducing additive can be added e.g. during steam treatment, after steam explosion, or during pelletizing or briquetting. The fouling-reducing additive can also reduce slagging in the furnace.

It has been found that such a suitable fouling-reducing additive is capable of increasing an ash melting temperature. The ash melting temperature refers to the initial deformation temperature of the ash remaining after burning the pellet. The ash remaining after burning the pellet comprises the ash from the biomass, and the ash resulting from the fouling-reducing additive. Typically, the fouling-reducing additive comprises only a little burnable material. This is in order to have a sufficient amount of remaining material in the ash, to increase the melting point of the ash. The fouling-reducing additive may comprise e.g. less than 30 w-% or less than 10 w-% burnable material.

Correspondingly, the fouling-reducing additive may be heat resistant up to at least 1650 K. The fouling-reducing additive may be selected such that, when heated up to 1650 K in the presence of at most 20 mol-% oxygen, at most 30% or at most 10% of the fouling-reducing additive will be oxidized. In an embodiment, the material of the fouling-reducing additive is selected such that, when the fouling-reducing additive is burned, the fouling-reducing additive forms ash having a melting point of al least 1650 K under oxidizing conditions. This may have the effect that if the ash from the biomass melts, some of it will be adhered onto the ash of the fouling-reducing additive. The additive will flow away from the furnace with the foul. In the alternative or in addition, the fouling-reducing additive, when flowing away from the furnace, may clean heat transfer surfaces of the furnace by adhering onto themselves molten ash from the heat transfer surfaces.

In the alternative or in addition, the fouling-reducing additive may chemically react with such components of the ash that a responsible for fouling. The fouling-reducing additive may be capable of chemically reacting with the steam-exploded biomass in such a way that the melting point of the ash of the combination of the additive and the steam-exploded biomass is higher than the melting point of the ash of the steam-exploded biomass Compounds that are responsible for fouling include alkali metals, especially light alkali metals such as sodium and potassium. E.g. aluminium silicates may react with potassium, which is known to adhere on heat transfer surfaces and cause corrosion. Aluminium silicates include various substances having a chemical formula of the form $x(Al_2O_3).y(SiO_2).z(H_2O)$, wherein x and y are integers at least one, and z is an integer at least zero, such as andalusite, kyanite, sillimanite, kaolinite, metakaolinite, and mullite.

Various type of heat resistant materials may affect the melting point of the ash of the burned biomass, such as pellet. Such materials include sand (sufficiently small, e.g. a sieve size of 0.1 mm-0.2 mm), chalk (i.e. limestone, $CaCO_3$), clay (in general), kaolin (type of clay), aluminium silicate (any type), rolovite (clay fraction), bentonite (clay fraction), dolomite ($CaMg(CO_3)_2$), magnesium carbonate ($MgCO_3$), coal fly ash, aluminium sulphate, mono calcium phosphate, dicalcium phosphate, calcite, bauxite, bentonite, bauxite, emalthite, gibbsite, hectorite, and halloysite. These materials are substantially free of burnable material, such as carbon. Correspondingly, they are heat resistant, as discussed above.

Preferably the fouling-reducing additive comprises at least one of kaolin, lime stone ($CaCO_3$), dolomite ($CaMg(CO_3)_2$), magnesium carbonate ($MgCO_3$), clay, and coal fly ash. These materials have been seen to perform well and they are also commonly available.

The substances of the combustion additive may be selected also from the point of view of exploiting the ash as a nutrient for land and farming. Thus, preferably, the combustion additive comprises at least one of calcium (Ca), magnesium (Mg), potassium (K) and phosphorus (P), optionally bound to other elements.

It has also been found that corrosion of the furnace or any other part of the system, wherein the solid biomass based fuel 300 is burned, can be reduced by adding some additive affecting the corrosion potential of biomass. The additive affecting the corrosion potential of biomass may be comprised by the combustion additive. The corrosion might be based on chlorine content of the fuel. An example of such additive is sulphur.

Correspondingly, in an embodiment, the combustion additive comprises some additive affecting the corrosion potential. Correspondingly an embodiment of solid biomass based fuel 300 comprises sulphur. Such solid biomass based fuel 300 may comprise from 0.1 w-% to 1 w-% sulphur. In addition to improved corrosion resistance, sulphur may also improve combustion efficiency.

Figure 3A:
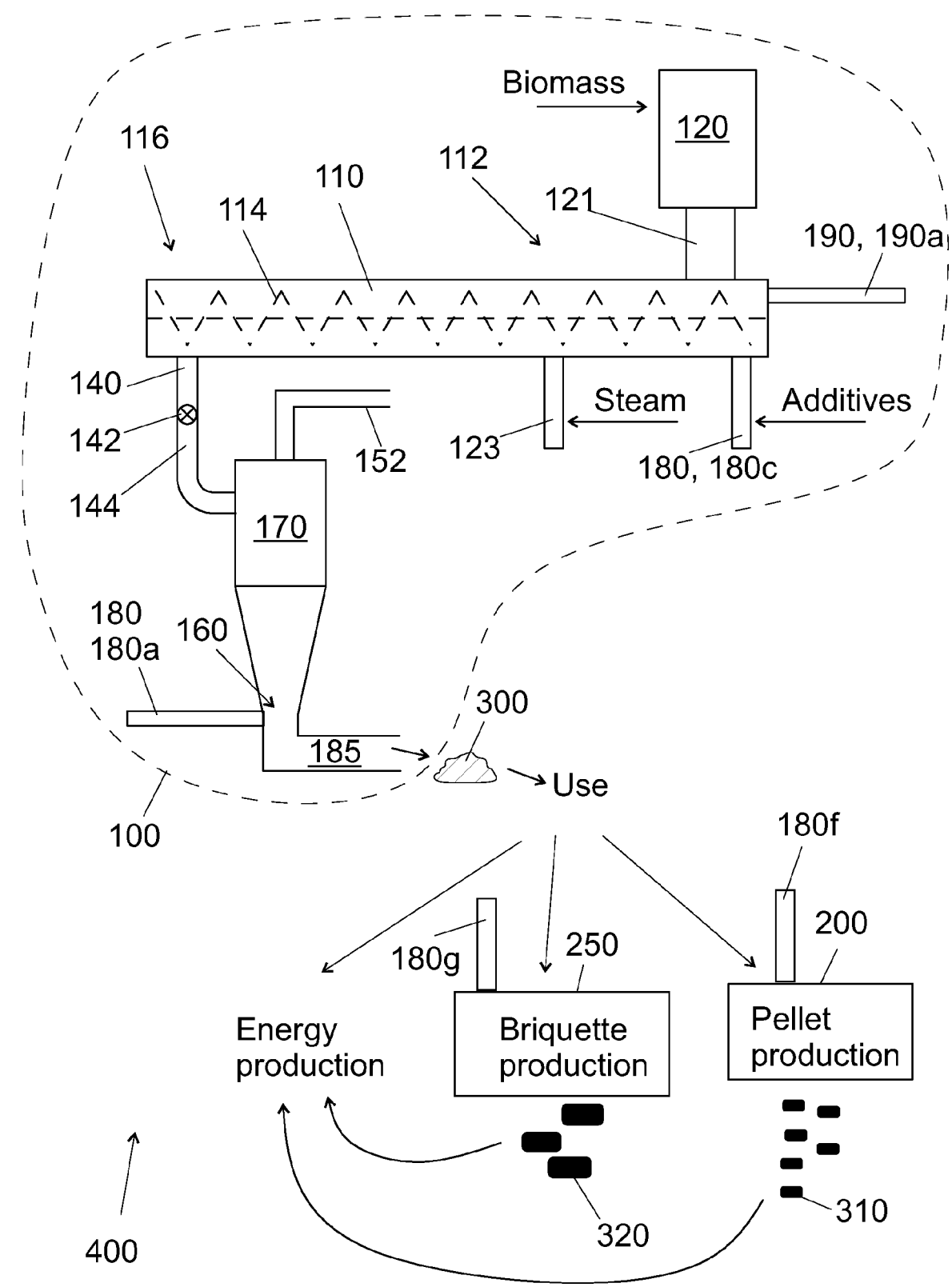
FIG. 3a shows an apparatus for producing solid biomass based fuel having reduced fouling or corrosive behaviour.

An embodiment of a method for manufacturing solid biomass based fuel 300 configured to reduce chemical and/or mechanical effects of flue gas on heat transfer surfaces comprises adding some combustion additive to the biomass or the steam-exploded biomass, wherein the combustion additive is capable of reducing chemical and/or mechanical effects of flue gas on heat transfer surfaces, e.g. heat transfer surfaces of a boiler. Also here the flue gas is considered to include all its components (see above). In an embodiment the combustion additive comprises fouling-reducing additive that is capable of increasing an ash melting temperature. Such additives, when burned, form ash having a higher melting point than the ash of the biomass. The ash of the biomass refers to the residual of the biomass, when burned. Correspondingly, an embodiment of solid biomass based fuel 300 having reduced fouling behaviour comprises steam-exploded biomass and some fouling-reducing additive, wherein the fouling-reducing additive is capable of increasing an ash melting temperature of the steam-exploded biomass. An embodiment of solid biomass based fuel 300 configured to reduce chemical and/or mechanical effects of flue gas on heat transfer surfaces comprises steam-exploded biomass and some combustion additive, wherein the combustion additive is selected from a group of additives that are capable of reducing chemical and/or mechanical effects of flue gas on heat transfer surfaces, e.g. heat transfer surfaces of a boiler. Also here the flue gas is considered to include all its components (see above). An embodiment of solid biomass based fuel 300 comprises steam-exploded biomass and some fouling-reducing additive, wherein the fouling-reducing additive selected from a group of additives that, when burned, form ash having a higher melting point than the ash of the biomass. Such solid biomass based fuel 300 configured to reduce chemical and/or mechanical effects of flue gas on heat transfer surfaces can be used to produce pellets 310 or briquettes 320, as indicated in FIG. 3a. In the alternative, the solid biomass based fuel 300 can be burned without making briquettes 320 or pellets 310 therefrom (see FIG. 3a).

Figure 3B:
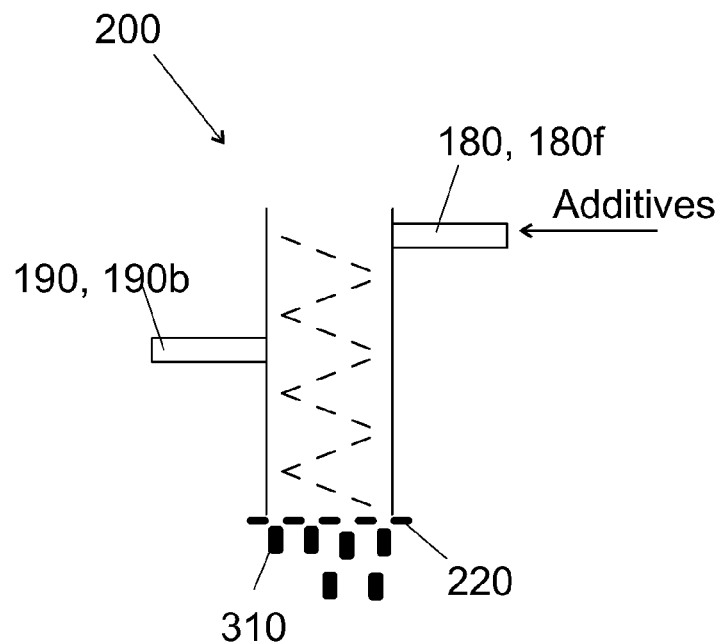
FIG. 3b shows a device for forming pellets from steam-exploded biomass or from solid biomass based fuel having reduced fouling or corrosive behaviour.
Figure 3C:
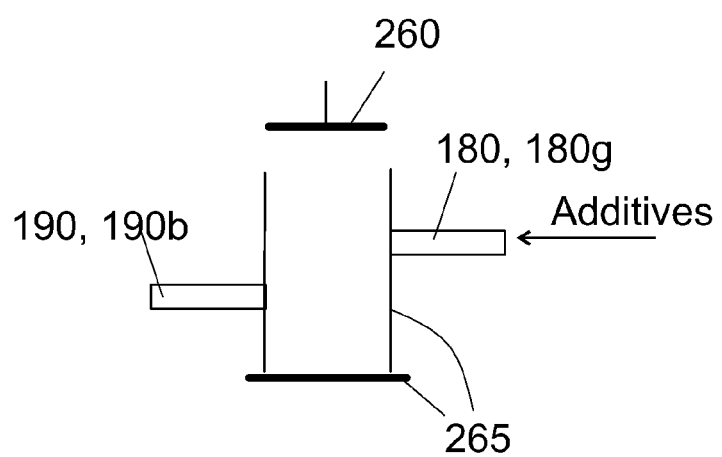
FIG. 3c shows a device for forming briquettes from steam-exploded biomass or from biomass based fuel having reduced fouling or corrosive behaviour.

Referring to FIG. 3a, a system 400 for producing pellets comprises an apparatus 100 for producing steam-exploded biomass configured to reduce chemical and/or mechanical effects of flue gas on heat transfer surfaces and a pelletizing device 200. The apparatus 100 for producing steam-exploded biomass comprises the reactor 110 as indicated above. The reactor may be a batch reactor or a continuous reactor. Depending on the use of the solid biomass based fuel 300, the system may further comprise a pelletizing device 200 (cf. FIG. 3b), or a briquetting device 250 (cf. FIG. 3c). However, the solid biomass based fuel 300 may be used as such. As indicated in FIG. 3b, the system 400 (or the apparatus 100) may comprise a second feeding means 180f configured to feed the combustion additive directly into a pelletization device 200. As indicated in FIG. 3c, a briquetting device 250 may comprise a compressing plate 260 and a mould, such as a space limited by walls 265. The plate 260 may be used to compress (a) steam-exploded biomass and the additive or (b) the solid biomass based fuel 300 to briquettes. As indicates, a second feeding means 180g may be configured to feed the additive directly into the briquetting device 250.

The apparatus 100 comprises a first feeding apparatus 121 configured to feed biomass into the reactor 110. In an embodiment, the apparatus 100 comprises a second feeding apparatus 180 (i.e. 180a, 180b, 180c, 180d, 180e) configured to feed at least some combustion additive to the biomass or the steam-exploded biomass. In an embodiment, the system 400 comprises a second feeding apparatus 180 (i.e. 180f, 180g) configured to feed at least some combustion additive into the pelletizing device 200 or the briquetting device 250. The system may comprise only one of the second feeding apparatuses 180a, 180b, 180c, 180d, 180e, 180f, 180g of FIGS. 3 and 4, or a suitable number of them. Moreover, the second feeding apparatus 180 may be configured to feed the combustion additive to the means 121 for feeding biomass to the reactor or to the container 120 for biomass. If fed to such locations, the combustion additive will be introduced into the reactor 110 with the biomass.

However, the combustion additive may increase erosion of the reactor 110, if fed therein. Thus, in an embodiment, the combustion additive (or additives) is/are added to the steam-exploded biomass, i.e. after the reactor 110. Because of the softening of the lignin in steam-explosion, the additive/additives is/are preferably fed to the steam-exploded biomass when the lignin is still soft. Preferably, the combustion additive (or at least some of the combustion additives) is added to such steam-exploded biomass that the temperature of the steam-exploded biomass is above 90° C. In an embodiment, the combustion additive (or at least some of the combustion additives) is added to such steam-exploded biomass that the temperature of the steam-exploded biomass is from 90° C. to 250° C. or from from 90° C. to 180° C.; or within limits defined later. In an embodiment, the combustion additive (or at least some of the combustion additives) is added to such steam-exploded biomass that the temperature of the steam-exploded biomass at most 250° C. or at most 180° C. In particular, when the combustion additive is added to biomass comprising softened lignin, the additives are intermixed with the softened lignin. When the lignin hardens, i.e. the temperature of the biomass decreases, the additives become bound to the biomass. When bound to biomass, the additives cause less erosion to the subsequent process equipment, such as a pelletization device 200 or a briquetting device 250. Moreover, in steam-explosion, the particle size of the biomass decreases, because at least some particles are torn into pieces. This increases the surface area of the biomass and helps the combustion additive/additives adhere into and/or onto the biomass.

As indicated above, preferably the apparatus 100 comprises the second feeding apparatus 180a that is configured to feed the combustion additive to the steam-exploded biomass after, and preferably substantially immediately after, the steam-exploded biomass has been separated from the steam with the means 170 such as a cyclone. The term substantially immediately refers to such a location after the cyclone 170, wherein, in use, the temperature of the steam-exploded biomass is at least 90° C., or within the aforementioned limits. The temperature of the steam-exploded biomass, to which the combustion additive is add, may be from 90° C. to 110° C., such as from 95° C. to 105° C. The second feeding apparatus 180a may be located e.g. at most 25 metres away from the cyclone 170. As indicated in FIG. 3a, preferably, the solid biomass based fuel 300, which comprises both the combustion additive and the steam-exploded biomass, is conveyed with e.g. a screw conveyor 185 to a storage or use. This has the effects that the screw conveyor mixes the steam-exploded biomass and the combustion additive well together. Preferably the screw conveyor 185 is a paddle screw conveyor 185, which even more effectively mixes the constituents. In a paddle screw conveyor, the screws are not continuous, whereby the parts of the screws constitute paddles that are configured to propel the material in the conveyor.

Figure 4:
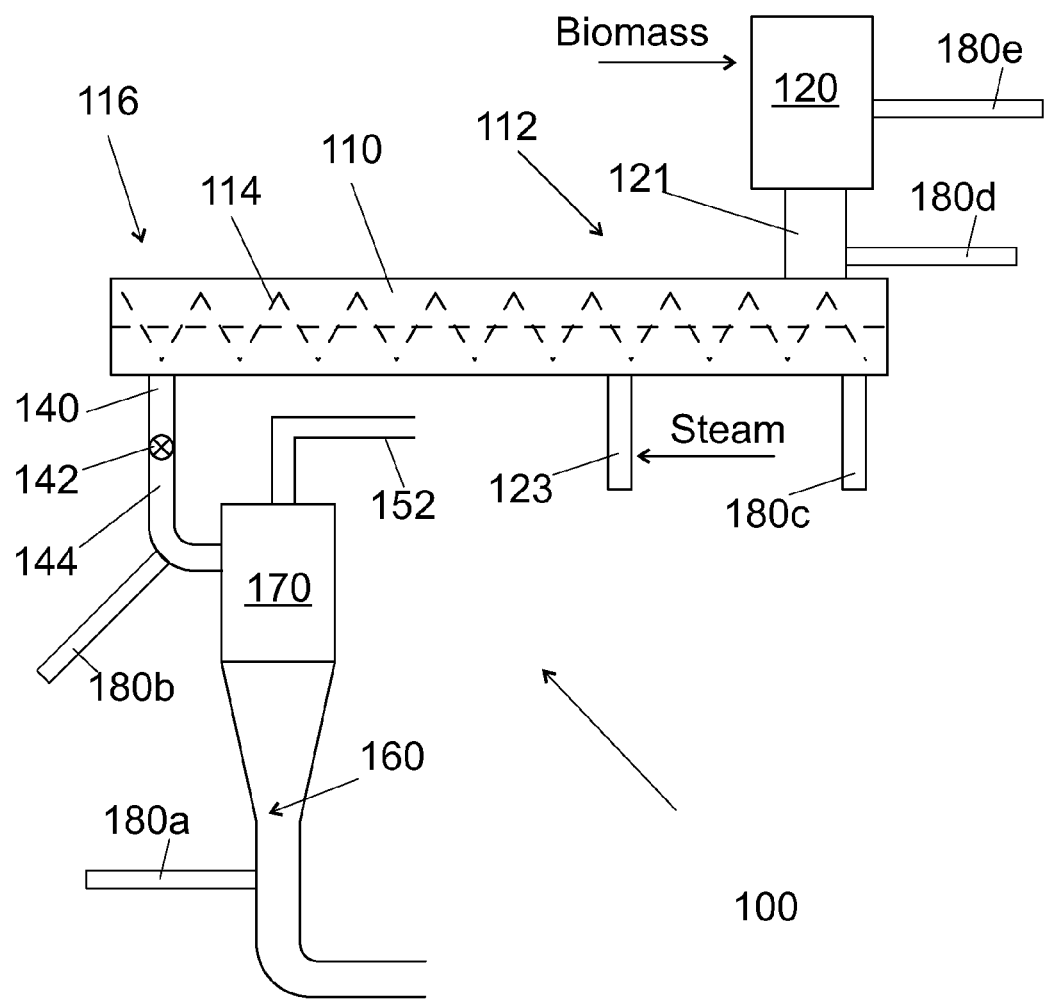
FIG. 4 shows a device for producing solid biomass based fuel having reduced fouling or corrosive behaviour.

With reference to FIG. 4, an embodiment of the apparatus 100 comprises a second feeding apparatus 180b configured to feed at least some combustion additive to the steam-exploded biomass, but before separation of steam. In an embodiment the apparatus 100 comprises a second feeding apparatus 180c configured to feed at least some combustion additive directly into the reactor 110. An embodiment of the apparatus 100 comprise a second feeding apparatus 180d configured to feed at least some combustion additive to the means 121 for feed biomass into the reactor 110. Thus, the second feeding apparatus 180d is configured to feed some combustion additive into the reactor 110 via the means 121. An embodiment of the apparatus 100 comprises a second feeding apparatus 180e configured to feed at least some combustion additive to the container 120 for storing biomass. Thus, the apparatus 180e is configured to convey some combustion additive into the reactor 110 via the container 120 and the means 121. The second feeding apparatus 180 may be a conveyor, e.g. a screw conveyor or a belt conveyor.

The means 180 may be configured to feed only a part of the combustion additive, such as only the fouling-reducing additive, to the biomass or steam exploded biomass. In addition, the system may comprise separate feeding apparatus 190 (190a, 190b) configured to feed another part of the combustion additive, such as the additive affecting the corrosion potential. Suitable positions for feeding the other part include those already discussed in connection with the means 180. The separate feeding apparatus 190, 190a, 190b may be a conveyor, e.g. a screw conveyor or a belt conveyor.

Moreover, it has been found, that when at least the fouling-reducing additives are fed to the reactor 110, in which the biomass is steam treated, the additives impregnate well into the biomass, and the ash forms in a homogeneous manner. As a result, a smaller amount of fouling reducing additive may suffice. Thus, the fouling-reducing additive may be fed into the reactor 110; directly or with biomass.

Such solid biomass based fuel has many practical advantages. The solid biomass based fuel can be used to replace at least some of the coal, thereby affecting the $CO_2$ effect of energy production. For example up to 70 w-% of the coal may be replaced. The solid biomass based fuel can be used without separate additives, and any special adding equipment, since the additives are included in the solid biomass based fuel. This makes the replacement of coal more easy as compared to using additives separately. In particular, no investments are needed at the power plant to the adding equipment. Moreover, the control of the amount of additives is more accurate, since the amount of additives can be selected according to the type of the biomass applied. Still further, the control of the type of additives is more accurate, since the type of additives can be selected according to the type of the biomass applied. For example, for some biomass the combustion additive may comprise only fouling-reducing additive; while for another type of biomass in addition sulphur can be used. Furthermore, the amount can be selected according to e.g. the ash content of the biomass. Thus, the total amount of additives may be reduced, as in the case of poor control the amount of the additive has to be selected by the worst possible scenario.

As a result of the combustion additive, the chemical and/or mechanical effects of flue gas on heat transfer surfaces will be reduced. The fouling may be reduced, and thus the need for soot blowing may be decreased. The tendency for corrosion may be reduced, and thus the expected life of the equipment may be increased. Moreover, the reduction of fouling also affects the applicability of wider range of biomass. By using selected additives, also biomass originating from hay and/or straw can be utilized as solid biomass based fuel. The corrosion of the furnace and heat exchange surfaces is reduced. The solid biomass based fuel can be easily ground to small size, as the solid biomass based fuel comprises steam-exploded biomass. This increases the milling capacity and reduces the operating costs. Still further, the quality of the ash can be improved, whereby its use as a fertilizer becomes possible. This reduces the ash deposition costs or even forms positive revenue.

Typically, irrespective of the type of the biomass, the amount (i.e. mass) of the combustion additive (in particular fouling-reducing additive), compared to the mass of the steam-exploded biomass is from 0.1% to 15%. Thus, in an embodiment, the solid biomass based fuel 300 comprises from 0.1 w-% to 15 w-% fouling-reducing additives in total. The combustion additive may further comprise sulphur or other additives affecting the corrosion potential. The amount of such additives may be e.g. at most 1 w-%, as discussed above. Thus, in an embodiment, the solid biomass based fuel 300 comprises from 0.1 w-% to 16 w-% combustion additives in total. Correspondingly, an embodiment of the solid biomass based fuel comprises at least 70 w-% burnable material, preferably at least 74 w-% or at least 79 w-% burnable material, such as steam-exploded biomass.

The amount of ash of the biomass contains depends on the type of the biomass. Typically, biomass originating from wood comprises only a little ash, such as 0.3 w-% to 1 w-%; while biomass originating from hay or straw or some waste fraction may contain much more ash, such as from 2 w-% to 10 w-%. Correspondingly, to increase the melting point of the ash, different amounts of fouling-reducing additives may be needed, depending on the type of the biomass. In an embodiment, the total content of the fouling-reducing additive of solid biomass based fuel is selected based on the type of the biomass. In an embodiment, the total content of combustion additive of solid biomass based fuel is selected based on the type of the biomass.

When using mainly wood-based biomass, the biomass that will be steam exploded, comprises at least 50 w-% wood-based biomass, and the solid biomass based fuel may comprise up to 2 w-% fouling-reducing additive, which is comprised by the combustion additive/additives. In addition, the combustion additive may comprise additive that reduces the corrosion potential. When using a combination of hay or straw or some waste as the biomass, the biomass that will be steam exploded comprises at least 50 w-% of some combination of hay and straw, and the solid biomass based fuel may comprise from 1 w-% to 15 w-% fouling-reducing additive, which is comprised by the combustion additive/ additives. In addition, the combustion additive may comprise additive that reduces the corrosion potential.

Typically, the combustion additive is fed in solid form. Suitable locations for feeding were discussed above. Typically, the combustion additive is fed in pulverized, solid form. The average particle size of the pulverized combustion additive may be e.g. at most 100 μm. Size of the particle refers to a sieve size. The average size refers to the average sieve size, the average calculated as a weight average (i.e. the average being $[\Sigma m_i d_i]/[\Sigma m_i]$, wherein $m_i$ is the mass of a particle and $d_i$ is its sieve size).

Examples of Embodiments

1. A method for manufacturing biomass based fuel 300 that is configured to reduce a chemical and/or mechanical effect of a component of flue gas on heat transfer surfaces, the method comprising
   providing biomass into a reactor 110,
   providing steam into the reactor 110,
   maintaining said biomass and said steam simultaneously in the reactor 110, in a pressure of at least 10 bar(a) and at a temperature from 180° C. to 250° C. for at least 2 minutes;
   decreasing the pressure in the reactor 110 and/or conveying biomass out of the reactor 110 such that the pressure of the environment of the biomass decreases below 5 bar(a), to produce steam-exploded biomass, and
   adding some combustion additive to the biomass and/or the steam-exploded biomass, wherein
   the combustion additive is capable of reducing a chemical and/or mechanical effect of a component of flue gas on heat transfer surfaces, e.g. heat transfer surfaces of a boiler, wherein the flue gas is obtainable by burning said steam-exploded biomass.
2. The method of example 1, wherein
   the combustion additive comprises some fouling-reducing additive.
3. The method of the example 2, wherein
   the fouling-reducing additive, when burned, forms ash having a higher melting point than the ash of the biomass.
4. The method of the example 2 or 3, wherein
   the fouling-reducing additive is selected from a group of additives that are capable of chemically reacting with such a compound of the biomass or steam-exploded biomass that causes fouling; preferably,
   the fouling-reducing additive is selected from a group of additives that are capable of chemically reacting with such a compound of the biomass or steam-exploded biomass that causes fouling in such a way that the melting point of the ash of the combination of the additive and the steam-exploded biomass is higher than the melting point of the ash of the steam-exploded biomass.
5. The method of any of the examples 1 to 4, wherein
   the combustion additive comprises at least one of kaolin, lime stone ($CaCO_3$), dolomite ($CaMg(CO_3)_2$), magnesium carbonate ($MgCO_3$), clay, coal fly ash, aluminium silicate such as kaolinite ($Al_2Si_2O_5(OH)_4$), emalthite, bentonite, and bauxite.
6. The method of any of the examples 1 to 5, wherein
   the combustion additive comprises at least one of calcium (Ca), magnesium (Mg), potassium (K) and phosphorus (P), optionally bound to other elements
7. The method of any of the examples 1 to 6, comprising
   maintaining said biomass and said steam simultaneously in the reactor 110 in a pressure of at most 35 bar(a).
8. The method of any of the examples 1 to 7, comprising
   maintaining said biomass and said steam simultaneously in the reactor 110 for at least 10 minutes, preferably at least 15 minutes; optionally at most 1 hour.
9. The method of any of the examples 1 to 8, comprising
   adding the combustion additive in such a way that the total content of the combustion additive of the biomass based fuel 300 is at least 0.1 w-% and at most 20 w-% of the amount of biomass based fuel 300; preferably
   adding such combustion additive that comprises fouling-reducing additive, that, when burned, forms ash having a higher melting point than the ash of the biomass, in such a way that the total content of the fouling-reducing additive of the biomass based fuel 300 is at least 0.1 w-% and at most 15 w-% of the amount of biomass based fuel 300.
10. The method of the examples 1 to 9, comprising
    selecting the total content of the combustion additive of the biomass based fuel based on the type of the biomass.
11. The method of any of the examples 1 to 10, wherein
    the biomass comprises at least 50 w-% of wood-based biomass, and
    the biomass based fuel comprises up to 2 w-% fouling-reducing additive, that, when burned, forms ash having a higher melting point than the ash of the biomass; optionally the biomass based fuel comprises up to 2 w-% combustion additive.
12. The method of any of the examples 1 to 11, wherein
    the biomass comprises at least 50 w-% of some combination of hay, straw or some waste, and
    the biomass based fuel comprises at least 1 w-% and up to 15 w-% fouling-reducing additive, that, when burned, forms ash having a higher melting point than the ash of the biomass; optionally the biomass based fuel comprises at least 1 w-% and up to 15 w-% combustion additive.
13. The method of any of the examples 1 to 12, wherein
    at least some of the combustion additive is added into the reactor 110.
14. The method of any of the examples 1 to 13, wherein
    at least some of the combustion additive is added to steam-exploded biomass after the reactor 110.
15. The method of any of the examples 1 to 14, comprising
    separating steam from the steam-exploded biomass in a means 170 for separating steam-exploded biomass from steam, e.g. in a cyclone 170, wherein
    at least some of the combustion additive is added to steam-exploded biomass after the means 170 for separating steam-exploded biomass from steam.
16. The method of the example 14 or 15, wherein
    at least some of the combustion additive is added to the steam-exploded biomass when the temperature of the steam-exploded biomass is at least 90° C.; preferably
    all or some of the combustion additive is added to the steam-exploded biomass when the temperature of the steam-exploded biomass is from 90° C. to 250° C.
17. The method of any of the examples 1 to 16, wherein
    the combustion additive is added in solid form.
18. The method of any of the examples 1 to 17, wherein
    the combustion additive is added in pulverized form.
19. The method of any of the examples 1 to 18, wherein
    the combustion additive is added in pulverized form having an average particle size of at most 100 μm.

20. The method of any of the examples 1 to 19, wherein
the combustion additive comprises an additive affecting the corrosion potential of the biomass based fuel 300; and/or
a further additive affecting the corrosion potential of the biomass based fuel 300 is added to the biomass and/or to the steam-exploded biomass.

21. The method of the example 20, wherein
the additive affecting the corrosion potential comprises sulphur.

22. The method of any of the examples 1 to 21, comprising
selecting the material of the combustion additive and/or the function of the combustion additive based on the type of the biomass.

23. The method of any of the examples 1 to 22, comprising
forming a pellet 310 comprising the steam-exploded biomass and the combustion additive.

24. The method of the example 23, comprising
forming a pellet 310 from a mixture of the steam-exploded biomass and the combustion additive.

25. The method of the example 23, comprising
forming a pellet 310 from the steam-exploded biomass by adding thereto the combustion additive during pelletization.

26. The method of any of the examples 1 to 22, comprising
forming a briquette 320 comprising the steam-exploded biomass and the combustion additive.

30. An apparatus 100 for producing biomass based fuel that is configured to reduce chemical and/or mechanical effects of a component of flue gas on a heat transfer surface (e.g. a heat transfer surface of a boiler), the apparatus 100 comprising
a reactor 110,
a first feeding apparatus 121 configured to feed biomass into the reactor 110,
a pipeline 123 configured to feed steam into the reactor 110,
optionally, a vessel 150 and means for conveying the biomass to the vessel 150,
means 160 for letting out steam-exploded biomass from the reactor 110 or the vessel 150, and
a second feeding apparatus 180, or at least two second feeding apparatuses 180, configured to feed at least some combustion additive to the biomass and/or the steam-exploded biomass.

31. The apparatus 100 of example 30, wherein
the second feeding apparatus 180, or one of the second feeding apparatuses 180, is configured to feed at least some of the combustion additive to the reactor 110.

32. The apparatus 100 of example 30 or 31, wherein
the second feeding apparatus 180, or one of the second feeding apparatuses 180, is configured to feed at least some of the combustion additive to the steam-exploded biomass after the reactor 110.

33. The apparatus 100 of example 32, wherein
the apparatus 100 comprises means 170 for separating steam-exploded biomass from steam, and
the second feeding apparatus 180, or one of the second feeding apparatuses 180, is configured to feed at least some of the combustion additive to the steam-exploded biomass after the means 170 for separating steam-exploded biomass from steam; preferably
the second feeding apparatus 180, or one of the second feeding apparatuses 180, is configured to feed at least some of the combustion additive to the steam-exploded biomass to such a location that, in use, comprises steam-exploded biomass having a temperature of at least 90° C.; preferably also at most 250° C.

34. The apparatus 100 of any of the examples 30 to 33, comprising
a third feeding apparatus 190 configured to feed some other additive 300 to the biomass and/or the steam-exploded biomass.

35. The apparatus 100 of any of the examples 30 to 34, wherein
the second feeding apparatus 180 is configured so that it can be used to feed at least a fouling-reducing additive. The fouling-reducing additive may comprise one or more additives from a group of additives that
(a) when burned, form ash having a higher melting point than the ash of the biomass and/or
(b) are capable of chemically reacting with such a compound of the biomass or steam-exploded biomass that causes fouling.

36. The apparatus 100 of any of the examples 30 to 35, wherein
the second feeding apparatus 180 is configured so that it can be used to feed at least a fouling-reducing additive comprising at least one of kaolin, lime stone ($CaCO_3$), dolomite ($CaMg(CO_3)_2$), magnesium carbonate ($MgCO_3$), clay, coal fly ash, kaolinite ($Al_2Si_2O_5(OH)_4$), emalthite, bentonite, and bauxite.

37. The apparatus 100 of any of the examples 30 to 36, wherein
the second feeding apparatus 180 is configured so that it can be used to feed only or also an additive affecting the corrosion potential of the biomass based fuel.

38. The apparatus 100 of the examples 30 to 37, wherein
the second feeding apparatus 180 is configured so that it can be used to feed only or also sulphur or other corrosion potential reducing chemical.

39. The apparatus 100 of the example 34 to 38, wherein
(A)
the third feeding apparatus 190, 190a, 190b is configured so that it can be used to feed sulphur or other corrosion potential reducing chemical and
the second feeding apparatus 180 is configured so that it can be used to feed at least a fouling-reducing additive or
(B)
the second feeding apparatus 180 is configured so that it can be used to feed sulphur or other corrosion potential reducing chemical and
the third feeding apparatus 190, 190a, 190b is configured so that it can be used to feed at least a fouling-reducing.

40. The apparatus 100 of any of the examples 30 to 39, wherein
the second feeding 180 apparatus is configured so that it can be used to feed a combustion additive in solid form.

41. The apparatus 100 of any of the examples 30 to 40, wherein
the second feeding apparatus 180 is configured so that it can be used to feed a combustion additive in pulverized form.

42. The apparatus 100 of any of the examples 30 to 41, wherein
the second feeding apparatus 180, 180a, 180b is configured so that it can be used to feed a combustion additive in pulverized form having an average particle size of at most 100 μm.

43. A system 400 comprising
the apparatus 100 of any of the examples 30 to 42 for producing biomass based fuel and
a pelletizing device 200 configured to form pellets 310 from at least steam-exploded biomass, wherein
the second feeding apparatus 180 is configured to feed the combustion additive
to the biomass or the steam-exploded biomass and
before or into the pelletizing device 200.

44. A system comprising
the apparatus 100 of any of the examples 30 to 42 for producing biomass based fuel and
a device 250 configured to form briquettes from at least steam-exploded biomass, wherein
the second feeding apparatus 180 is configured to feed the combustion additive
to the biomass or the steam-exploded biomass and
before or into the device 250 configured to form briquettes from at least steam-exploded biomass.

47. Biomass based fuel 300 that is configured to reduce a chemical and/or a mechanical effect of a component of flue gas on a heat transfer surface, the biomass based fuel 300 comprising
steam-exploded biomass and
some combustion additive, wherein
the combustion additive is selected from a group of additives that are capable of reducing a chemical and/or mechanical effect of a component of flue gas on a heat transfer surface, such as a heat transfer surface of a boiler, wherein
the flue gas is obtainable by burning the steam-exploded biomass.

48. The biomass based fuel 300 of the example 47, wherein the combustion additive comprises
some fouling-reducing additive.

49. The biomass based fuel 300 of the example 48, wherein
the fouling-reducing additive is selected from a group of additives that, when burned, form ash having a higher melting point than the ash of the biomass.

50. The biomass based fuel 300 of the example 48 or 49, wherein
the fouling-reducing additive is selected from a group of additives that are capable of chemically reacting with such a compound of the biomass or steam-exploded biomass that causes fouling; preferably
the fouling-reducing additive is selected from a group of additives that are capable of chemically reacting with such a compound of the biomass or steam-exploded biomass that causes fouling in such a way that the melting point of the ash of the combination of the additive and the steam-exploded biomass is higher than the melting point of the ash of the steam-exploded biomass.

51. The biomass based fuel 300 of any of the examples 48 to 50, wherein
the fouling-reducing additive comprise at least one of kaolin, lime stone ($CaCO_3$), dolomite ($CaMg(CO_3)_2$), magnesium carbonate ($MgCO_3$), clay, coal fly ash, kaolinite ($Al_2Si_2O_5(OH)_4$), emalthite, bentonite, and bauxite.

52. The biomass based fuel 300 of any of the examples 47 to 51, wherein
the combustion additive comprises at least one of calcium (Ca), magnesium (Mg), potassium (K) and phosphorus (P), optionally bound to other elements.

53. The biomass based fuel 300 of any of the examples 47 to 52, comprising
from 0.1 w-% to 15 w-% of the fouling-reducing additive or
from 0.1 w-% to 20 w-% of the combustion additive.

54. The biomass based fuel 300 of any of the examples 47 to 53, wherein the steam-exploded biomass comprises defibrillated cellulose.

55. The biomass based fuel 300 of any of the examples 47 to 54, wherein the steam-exploded biomass comprises broken cellulose fibres.

56. The biomass based fuel 300 of any of the examples 47 to 55, wherein the steam-exploded biomass comprises lignin.

57. The biomass based fuel 300 of any of the examples 47 to 56, being dark brown in colour.

58. The biomass based fuel 300 of any of the examples 47 to 57, wherein
the steam-exploded biomass comprises hydroxymethylfurfural (HMF) and/or furfural.

59. The biomass based fuel 300 of any of the examples 47 to 58, wherein
the steam-exploded biomass comprises pseudolignin.

60. The biomass based fuel 300 of any of the examples 47 to 59, wherein
the steam-exploded biomass comprises such hemicellulose that is released from cell walls of biomass.

61. The biomass based fuel 300 of any of the examples 47 to 60, wherein the steam-exploded biomass comprises cellulose microfibrils.

62. The biomass based fuel 300 of the example 61, wherein the steam-exploded biomass comprises beads of lignin on the surfaces of the cellulose microfibrils.

63. The biomass based fuel 300 of any of the examples 49 to 62, comprising
at least 50 w-% steam-exploded biomass originating from wood and
up to 2 w-% of the fouling-reducing additive or up to 3 w-% of the combustion additive.

64. The biomass based fuel 300 of any of the examples 49 to 63, comprising
at least 50 w-% in total of
such steam-exploded biomass that originates from hay,
such steam-exploded biomass that originates straw, and
such steam-exploded biomass that originates from some waste
from 2 w-% to 15 w-% of the fouling-reducing additive or
from 2 w-% to 20 w-% of the combustion additive.

65. The biomass based fuel 300 of any of the examples 49 to 64, comprising some additive affecting the corrosion potential of the biomass.

66. The biomass based fuel 300 of any of the examples 49 to 65, comprising sulphur.

67. The biomass based fuel 300 of any of the examples 49 to 66, comprising at least 0.1 w-% sulphur.

68. The biomass based fuel 300 of any of the examples 49 to 67, comprising at most 1 w-% sulphur.

69. The biomass based fuel of any of the examples 49 to 68, wherein
the biomass based fuel 300 is in solid form, for example granular or powdered.

70. A pellet 310 comprising the solid biomass based fuel of any of the examples 49 to 69.

71. The pellet 310 of the example 70 having a density from 630 kg/m$^3$ to 1300 kg/m$^3$.

72. A briquette 320 comprising the solid biomass based fuel of any of the examples 49 to 69.

81. An apparatus for producing biomass based fuel, the apparatus comprising
a reactor,
a first feeding apparatus configured to feed biomass into the reactor,
a pipeline configured to feed steam into the reactor,
an outlet for letting out steam-exploded biomass, and
a second feeding apparatus configured to feed at least some combustion additive to the biomass and/or the steam-exploded biomass.

82. The apparatus of example 81, wherein
the second feeding apparatus is configured to feed at least some of the combustion additive to the steam-exploded biomass.

83. The apparatus of example 82, comprising
means for separating steam-exploded biomass from steam, wherein
the second feeding apparatus is configured to feed at least some of the combustion additive to the steam-exploded biomass after the means for separating steam-exploded biomass from steam.

84. The apparatus of example 82 or 83, comprising
means for separating steam-exploded biomass from steam, wherein
the second feeding apparatus is configured to feed at least some of the combustion additive to such a location that, in use, comprises steam-exploded biomass having a temperature of at least 90° C.

85. The apparatus of any of the examples 81 to 84, wherein
the second feeding apparatus is configured so that it can be used to feed a combustion additive in pulverized form having an average particle size of at most 100 μm.

The invention claimed is:

1. A method for manufacturing biomass based fuel, the method comprising:
providing biomass into a reactor;
providing steam into the reactor;
maintaining said biomass and said steam simultaneously in the reactor, in a pressure of at least 10 bar(a) and at a temperature from 180° C. to 250° C. for at least 2 minutes;
decreasing the pressure in the reactor and/or conveying biomass out of the reactor such that the pressure of the environment of the biomass decreases below 5 bar(a), to produce steam-exploded biomass; and
adding some combustion additive to the biomass and/or the steam-exploded biomass,
wherein:
the combustion additive either (a) is selected from a group consisting of aluminium silicates, chalk, clay, dolomite, magnesium carbonate, coal fly ash, aluminium sulphate, mono calcium phosphate, dicalcium phosphate, calcite, bauxite, bentonite, bauxite, emalthite, gibbsite, hectorite, halloysite, and sulphur, or (b) comprises at least one of calcium, magnesium, potassium and phosphorus; and
either: (c) at least some of the combustion additive is added to steam-exploded biomass after the reactor and the combustion additive is added to the steam-exploded biomass when the temperature of the steam-exploded biomass is at least 90° C., or (d) at least some of the combustion additive is added into the reactor.

2. The method of claim 1, further comprising selecting the total content and/or the material of the combustion additive of the biomass based fuel based on the type of the biomass.

3. The method of claim 1, wherein the combustion additive comprises at least one of kaolin, lime stone ($CaCO_3$), dolomite ($CaMg(CO_3)_2$), magnesium carbonate ($MgCO_3$), clay, coal fly ash, kaolinite ($Al_2Si_2O_5(OH)_4$), emalthite, bentonite, aluminium silicate, and bauxite.

4. The method of claim 1, wherein the amount of the combustion additive is at least 0.1 w-% and at most 16 w-% of the amount of the biomass based fuel.

5. The method of claim 1, wherein the combustion additive comprises sulphur.

6. The method of claim 1, wherein both:
at least some of the combustion additive is added into the reactor; and
at least some of the combustion additive is added to steam-exploded biomass after the reactor and the combustion additive is added to the steam-exploded biomass when the temperature of the steam-exploded biomass is at least 90° C.

* * * * *